United States Patent

[11] 3,588,497

| [72] | Inventor | Robert J. Jordan<br>Lexington Park, Md. |
|---|---|---|
| [21] | Appl. No. | 833,034 |
| [22] | Filed | June 13, 1969 |
| [45] | Patented | June 28, 1971 |
| [73] | Assignee | The United States of America as represented by the Secretary of the Navy |

[54] APPARATUS FOR MEASURING THE CONCENTRATION OF GUN GAS AND FOR DEACTIVATING A GUN AT DANGEROUS GAS LEVELS
8 Claims, 1 Drawing Fig.

| [52] | U.S. Cl. | 250/43.5R, 250/83.3H |
|---|---|---|
| [51] | Int. Cl. | G01n 21/26 |
| [50] | Field of Search | 250/43.5 |

[56] References Cited
UNITED STATES PATENTS

| 2,882,693 | 4/1959 | Clay | 250/43.5 |
|---|---|---|---|
| 3,105,147 | 9/1963 | Weilbach et al. | 250/43.5 |
| 3,415,984 | 12/1968 | Trungel | 250/43.5 |

Primary Examiner—James W. Lawrence
Assistant Examiner—C. E. Church
Attorneys—Edgar J. Brower, Thomas O. Watson, Jr. and Anderson R. R.

ABSTRACT: A device for measuring the explosive content of gas in a gun bay. A beam of modulated light is projected across the compartment to shine on a bolometer which measures the infrared absorption by the gas in the compartment. When the lower explosive limit of the gas is approached an alarm sounds and a relay deactivates the gun.

PATENTED JUN 28 1971
3,588,497
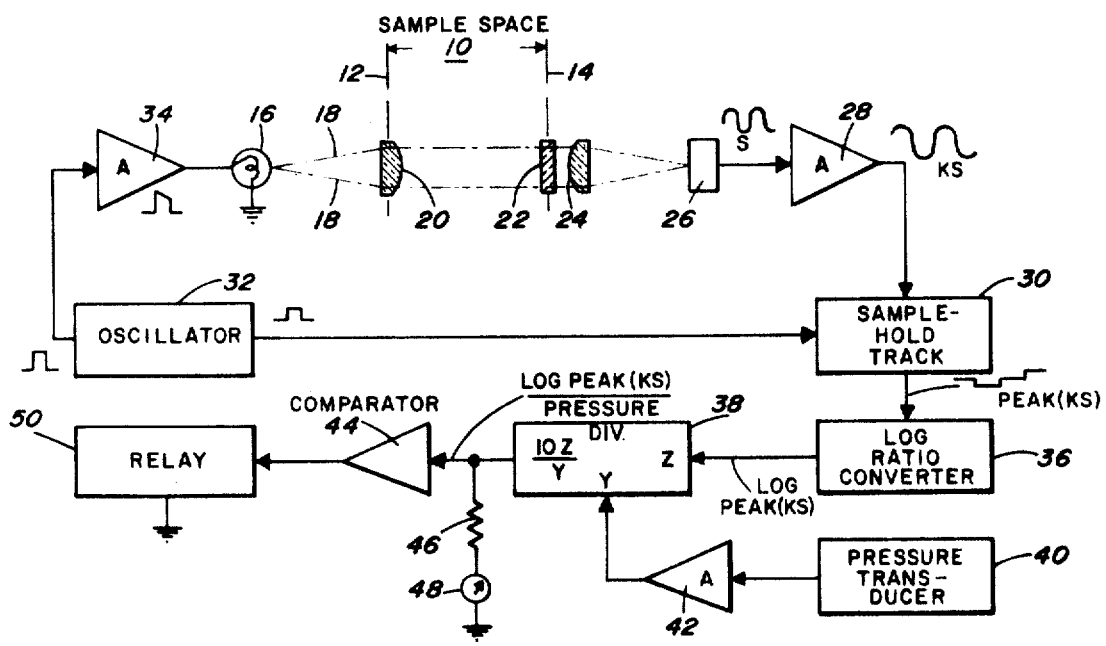
INVENTOR
ROBERT J. JORDAN
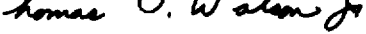

3,588,497

APPARATUS FOR MEASURING THE CONCENTRATION OF GUN GAS AND FOR DEACTIVATING A GUN AT DANGEROUS GAS LEVELS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to gas detectors and more particularly to gas detectors which are used to determine the explosive content of gas in a relatively confined area, such as, for example, the gun bay aboard an airplane, or a warship, as well as in a coal or other underground mining operation.

For many years the sampling and explosive analysis of gases confined in compartments wherein personnel work and live has been an important and continuing function to insure the safety and well being of this personnel. Many systems have been developed in the past to perform this detection and analysis, with the majority of them being based upon the utilization of either an ionization chamber or a hot wire filament system. In the filament system, for example, the gas under analysis is passed over a hot platinum filament which forms one arm of a balanced bridge electrical system. The presence of gas causes a change in resistance of the platinum filament thereby causing an unbalancing of the bridge, the amount of unbalance being in direct proportion to the concentration of the combustible material in the gas.

Effective as they were these prior art systems, nevertheless, had a number of inherent disadvantages. For example, the response time of the hot platinum filament system was not rapid enough to be effective if the gas build up was in a critical state. Also deterioration and corrosion of the filament wire resulted in considerable loss in sensitivity, requiring frequent recalibration and repair of the device. Should any of these prior art devices be installed in the gun bay of an airborne gun installation they would be sadly lacking in effectiveness in a situation where fast and accurate operation would be of utmost importance.

SUMMARY OF THE INVENTION

The present invention eliminates a vast majority of the above listed disadvantages and offers a material improvement in the art of gas detection. The present invention employs infrared absorption techniques whereby the absorption characteristics of the gas under examination are used. A beam of light is projected across the gun bay compartment and onto a bolometer, the amount of transmitted infrared being detected by the bolometer and then its output signal is amplified electrically and converted to an electronic signal representing the percentage of gas present. The lower explosive limit of a gas is also a function of pressure so the pressure in the compartment is measured and used to correct the percent reading electrically. Should the gas in the compartment reach a percentage of 90 percent of the explosive limit then a relay is activated to inhibit further firing of the gun.

An object of the present invention is the provision of an explosive gun gas detector.

Another object of the present invention is the provision of a gun detector which has a high rate of response.

Still another object of the present invention is the provision of a gas detector which measures the lower explosive limit of the gas.

Yet another object of the present invention is the provision of a gas detector which inhibits the firing of a gun when the gas reaches a dangerous concentration.

Yet another object of the invention is the provision of a gas detector which measures the infrared absorption of the gas under the test.

Yet another object of the present invention is the provision of an explosive gas detector which measures the infrared absorption of the gas and the pressure of the gas to provide an electronic signal representative of percentage of gas present.

Other objects, advantages and novel features of the invention will become apparent from the following detailed description of the invention when considered in conjunction with the accompanying drawings.

BRIEF DESCRIPTION OF THE DRAWINGS

FIG. 1 shows a schematic diagram of the invention.

DESCRIPTION OF THE PREFERRED EMBODIMENTS

Referring now to FIG. 1 of the drawing there will be seen a sample space 10 which is used to represent the compartment, gun bay, or other area which is under surveillance for the presence of explosive gas, a space being defined by walls or partitions 12 and 14. A lamp, or other source of illumination, 16 is so positioned that it directs its rays of light 18 across the compartment 10, a first IR lens 20 being positioned at the near wall to focus rays 18 into parallel relationship across the compartment. At the far wall, and positioned in the beam of light, there is an interference filter 22 which serves to pass infrared rays but rejects other interference, the light passing through the filter 22 before going through a second IR lens 24, lens 24 acting to focus light rays 18 onto a bolometer 26.

Any infrared radiation received by the bolometer 26 produces a signal at its output which is then applied to an amplifier 28 which after amplification is applied as one input to a sample-hold-track circuit 30. An oscillator 32 produces two outputs, one of which is applied to an amplifier 34 before being coupled to lamp 16, the oscillator 32 functioning to produce a modulated light from lamp 16. The second output from oscillator 32 is connected directly as another input to the sample-hold-track device 30.

After operating on the signal from amplifier 28 and the signal from oscillator 32 the sample-hold-track circuit 30 produces an output which is applied to a log ratio converter 36, this in turn connecting the signal to a divider circuit 38. In order to measure the gas pressure in the compartment 10 there is provided a pressure transducer 40 whose output passes through an amplifier 42 before being applied as a second input to divider 38. It may be noted here that the output of the log ratio converter 36 consists of the logarithm of the peak signal from sample-hold-track device 30 while the pressure output from pressure transducer 40 is in the order of magnitude of 10 volts for each 30 inches of mercury, these two quantities being divided by divider circuit 38 to produce an output which is the ratio of log peak to pressure. The output of divider circuit 38 splits into two signal paths, one being to a dropping resistor 46 before application to a meter 48, and the other output being fed to a comparator circuit 44 before being applied to a relay 50. It should be noted here that the comparator 44 is set to produce an output at a point that is slightly less than the lower explosive level of the gas, so in this way the relay system 50 will operate when the gas concentration reaches a dangerous point.

When considering the operation of the device it will be seen that oscillator 32 emits a series of square wave pulses which are amplified by amplifier 34 and applied to lamp 16 to produce a series of modulated light beams 18. The gun bay 10, or other space which is under surveillance, is defined by walls 12 and 14, wall 12 having a lens 20 mounted therein while wall 14 has an interference filter 22. Light rays 18 pass through lens 20, across the gun bay space 10, through interference filter 22, a second lens 24, and on to the bolometer 26 which measures the amount of infrared radiation reaching that point. The output of the bolometer is then amplified by an amplifier 28 and applied to a sample-hold-track circuit 30. Sample-hold-track hold 30 acts as a sampling means to periodically sample the output of the bolometer and to record the peak values of this output. The circuit has a series of gate circuits incorporated in it which are triggered by the oscillator 32 so that the gates are timed to be enabled when the peak signals from the bolometer may be expected.

The output of the sample-hold-track circuit 30 is then applied to a logarithmic converter 36 and the logarithms of these peak signals are applied to a division circuit 38. Also applied to division circuit 38 is a pressure signal which is derived from pressure transducer 40, this pressure transducer measuring the atmospheric pressure in the gun bay before being amplified by amplifier 42 to produce a signal in the order of a 10 volt signal for each 30 inches of mercury. The output of division circuit 38, which is in effect the logarithm of the peak signals divided by the pressure signal, is applied to a comparator 44 which is set to trip at slightly less than the lower explosive level of the gas in the gun bay and should this level be exceeded the output from comparator 14 will activate relay 15 thereby energizing a signal alarm and deactivating the gun. A meter 48 and dropping resistor circuit is likewise connected to the output of the division circuit to give a visual reading of its output.

From the above description of the structure and operation of the present invention it is obvious that there is disclosed a device which offers considerable improvement in the art of gun gas detectors. The present system is much faster than any previous method used, there are no repeated calibrations necessary, and there are no filaments to burn out, and furthermore there are no moving parts in the device except the needle on the indicator.

Obviously many modifications and variations of the present invention are possible in the light of the above teachings.

I claim:

1. An explosive gun gas detector comprising:
   a source of infrared energy;
   means for pulsing the source of infrared energy;
   means for projecting the pulsed infrared energy across a area under surveillance for the presence of explosive gas;
   means for measuring the amount of energy absorbed as it passes through the area under surveillance;
   gate circuit means connected to the output of the measuring means for registering maximum peaks in the output of the measuring means and which is keyed by the means for pulsing to take samples of the output of the measuring means in synchronism with pulsing of the infrared energy;
   a converter connected to the sampling means for converting the peak output signals into logarithms;
   pressure means for measuring the pressure in the area under surveillance;
   a divider connected to the converter and the pressure means for producing a voltage of the log peak voltage divided by the pressure voltage;
   comparator means to compare the output of the divider with a reference voltage which is set at a value to produce an output from the comparator means when the gas in the compartment under surveillance has reached a concentration slightly less than the lower explosive limit of the gas; and
   utilization means to be activated if there is an output from the comparison means.

2. The device of claim 1 wherein the source of radiant energy is a lamp.

3. The device of claim 2 wherein the means for pulsing the source of radiant energy is an oscillator.

4. The device of claim 3 wherein the projecting means is a system of lenses.

5. The device of claim 4 wherein the measuring means is a bolometer.

6. The device of claim 5 wherein the converter is a log ratio converter.

7. The device of claim 6 wherein the pressure means is a pressure transducer.

8. The device of claim 7 wherein the utilization means includes a meter and a relay for deactivating the gun.